(12) United States Patent
Bergmann

(10) Patent No.: US 8,561,532 B2
(45) Date of Patent: Oct. 22, 2013

(54) STUFFING DEVICE

(75) Inventor: Thomas Bergmann, Neustadt (DE)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/456,232

(22) Filed: Apr. 26, 2012

(65) Prior Publication Data

US 2012/0204740 A1 Aug. 16, 2012

Related U.S. Application Data

(63) Continuation of application No. PCT/NL2010/000150, filed on Oct. 21, 2010.

(30) Foreign Application Priority Data

Nov. 2, 2009 (NL) ..................................... 1037434
Nov. 6, 2009 (NL) ..................................... 1037453

(51) Int. Cl.
*A01F 15/10* (2006.01)
*B30B 15/30* (2006.01)
*B30B 9/30* (2006.01)

(52) U.S. Cl.
USPC ............................. 100/189; 100/179; 56/341

(58) Field of Classification Search
USPC ........ 100/142, 188 R, 189, 215, 179; 56/341, 56/344
See application file for complete search history.

(56) References Cited

U.S. PATENT DOCUMENTS

| | | | |
|---|---|---|---|
| 4,106,268 A | 8/1978 | White et al. | |
| 4,135,444 A | 1/1979 | White et al. | |
| 4,656,938 A * | 4/1987 | Webb et al. | 100/189 |
| 4,825,760 A | 5/1989 | Weddeling | |
| 5,467,702 A | 11/1995 | Naaktgeboren et al. | |
| 6,050,074 A | 4/2000 | Clostermeyer | |
| 6,385,952 B1 * | 5/2002 | Bergkamp et al. | 56/341 |
| 6,915,736 B2 * | 7/2005 | Leupe et al. | 100/45 |
| 2003/0159421 A1 * | 8/2003 | Trelstad et al. | 56/341 |
| 2006/0124002 A1 | 6/2006 | Dubois | |

FOREIGN PATENT DOCUMENTS

| | | |
|---|---|---|
| EP | 870425 A1 | 10/1998 |
| EP | 1769674 A1 | 4/2007 |

OTHER PUBLICATIONS

International Search Report of PCT/NL2010/000150, issued on Mar. 14, 2011.

* cited by examiner

*Primary Examiner* — Jimmy T Nguyen

(74) *Attorney, Agent, or Firm* — Hoyng Monegier LLP; Coraline J. Haitjema; David P. Owen

(57) ABSTRACT

The invention relates to an agricultural piston bale press. This press includes a pressing piston arranged in a bale chamber, an intake device to take in crop material, and a stuffing device, wherein the stuffing device includes a feed passage and a stuffing mechanism, the stuffing mechanism includes an arm supporting tines, wherein said arm is movable by a first driving device to at least move the tines in and out of the feed passage and wherein said arm is pivotably supported by a fulcrum, the fulcrum being displaceable to selectively move the arm along the stuffing trajectory or load trajectory. The stuffing device includes a second driving device to displace the fulcrum, and in that the second driving device is mechanically independent of the main driving mechanism.

15 Claims, 7 Drawing Sheets

STUFFING DEVICE

CROSS REFERENCE TO RELATED APPLICATIONS

This application is a continuation of PCT application number PCT/NL2010/000150 filed on 21 Oct. 2010, which claims priority from Netherlands application number 1037434 filed on 2 Nov. 2009, as well as from Netherlands application number 1037453 filed on 6 Nov. 2009. All applications are hereby incorporated by reference in their entireties.

BACKGROUND OF THE INVENTION

1. Field of the Invention

The present invention relates to a piston bale press for forming rectangular bales of crop material.

2. Description of the Related Art

Such piston bale presses are for instance disclosed in EP 1 769 674, EP 0870 425, and U.S. Pat. No. 4,106,268, which are hereby incorporated by reference in their entireties.

EP 1 769 674 discloses an agricultural piston bale press, comprising:

a pressing piston arranged in a bale chamber to form bales or crop material a main driving mechanism to drive the pressing piston in an oscillating movement in the bale chamber;

an intake device to take in crop material, and a stuffing device to stuff crop material taken in by the intake device and to load the stuffed crop material to the bale chamber, wherein the stuffing device comprises a feed passage and a stuffing mechanism, the stuffing mechanism comprising an arm supporting tines which arm can be moved along a stuffing trajectory to stuff crop material in said feed passage and a load trajectory to load stuffed crop material from said feed passage in said bale chamber, wherein said arm is movable by a first driving device to at least move the tines in and out of the feed passage and wherein said arm is pivotably supported by a fulcrum, the fulcrum being displaceable to selectively move the arm along the stuffing trajectory or load trajectory.

The arm of the stuffing device is connected to the main drive mechanism of the pressing piston via a mechanical linkage system, wherein one of the linkages comprises a telescopic element which can be brought in a non-blocked and a blocked position.

In the non-blocked position of the telescopic element the arm is moved along a stuffing trajectory, and in the blocked position of the telescopic element the arm is moved along a load trajectory. In the stuffing trajectory small cycles are made near the inlet of the feed passage to stuff crop material introduced by the intake device in the feed passage. When the crop material in the feed passage is sufficiently compressed, the telescopic element is blocked. As a consequence the arm will follow the load trajectory wherein the contents of the feed passage are transferred to the bale chamber of the pressing piston.

A drawback of the bale press of EP '674 is that the mechanical linkage system has a relative complex construction. Furthermore, the mechanical linkage system of EP '674 provides low flexibility with respect to the trajectory of movement of the arm.

BRIEF SUMMARY OF THE INVENTION

It is an aim of the invention to provide an alternative agricultural piston bale press of relative simple design, wherein the stuffing device preferably provides more flexibility in the trajectories of the arm of the stuffing device.

The present invention provides an agricultural piston bale press comprising:

a pressing piston arranged in a bale chamber to form bales or crop material; a main driving mechanism to drive the pressing piston in an oscillating movement in the bale chamber; an intake device to take in crop material; and a stuffing device to stuff crop material taken in by the intake device and to load the stuffed crop material to the bale chamber. The stuffing device comprises a feed passage and a stuffing mechanism, the stuffing mechanism comprising an arm supporting tines which arm is configured for movement along a stuffing trajectory to stuff crop material in said feed passage and a load trajectory to load stuffed crop material from said feed passage in said bale chamber. The arm is movable by a first driving device to at least move the tines in and out of the feed passage and wherein said arm is pivotably supported by a fulcrum, the fulcrum being displaceable to selectively move the arm along the stuffing trajectory or load trajectory. Further, the stuffing device comprises a second driving device to displace the fulcrum, and in that the second driving device is mechanically independent of the main driving mechanism.

Mechanically independent means that the second driving device is not linked to the main driving mechanism by mechanical links, such as bars, pistons, or gears to directly transfer any movement of the main driving mechanism to the second driving device and/or the fulcrum.

By making the second driving device mechanically independent of the main driving mechanism, the fulcrum pivotably supporting the arm may be moved independent of the oscillating movement of the piston press. As a result, the flexibility of the movements that can be made by the arm is substantially increased.

However, to one of ordinary skill in the art it will be clear that the movement of the fulcrum as caused by the second driving device still has to be adapted to the oscillating movement of the pressing piston. In particular, the crop material in the feed passage should only be transferred to the bale chamber when the piston press does not obstruct the passage to the bale chamber, and the crop material is introduced at the correct side of the pressing piston.

In one embodiment actuation of the second driving device is adjustable in order to adjust, when desired, distance and/or speed of displacement of the fulcrum.

By providing an adjustable second driving device the distance and/or speed of displacement of the fulcrum may be adjusted to the circumstances of the stuffing process or other variables. For instance, it may be possible to increase the speed of the arm in parts of the trajectory in which the arm does not have to exert a pressure on crop material. Also, it may be possible to decrease the distance of displacement of the fulcrum from the first position to an intermediate position between the first and second position. As a result, the trajectory of the tines will be longer than the smaller stuffing cycle with no movement of the fulcrum, but smaller than the load cycle. Such intermediate cycle may for instance be useful to adapt a stuffing trajectory to the kind of crop material and the moisture content of the crop material. As it is possible to adjust distance and/or speed of displacement of the arm any suitable trajectory can be designed. In an embodiment, it may also be possible to adjust the maximum force exerted by the arm.

In another embodiment, the second driving device may comprise any suitable type of actuator, for instance a mechanical or electrical actuator. Preferably, the second driving device comprises a hydraulic actuator, more preferably a hydraulic rotary actuator. A hydraulic actuator is very suitable to be used in the second driving device. A hydraulic actuator can be made relative compact, can exert a large force and is reliable. Furthermore, on an agricultural machine of this type, or on the vehicle pulling it there is usually a hydraulic pressure source present. No separate source of energy has to be provided.

In yet another embodiment, the second driving device comprises two hydraulic actuators which can be actuated serially and in parallel. When the hydraulic actuators are actuated in parallel, the force exerted by the pair of hydraulic actuators is the sum of the forces of the actuators separately. Such increased force is useful when crop material has to be pressed through the feed passage, for instance during the part of a load cycle where crop material is pressed out of the feed passage into the bale chamber.

In contrast, when the hydraulic actuators are actuated serially the force exerted on the fulcrum will be equal to the force of one actuator, but the speed with which the fulcrum can be moved will be increased. Such increased speed is in particular useful when no or little force has to be exerted by the arm, for instance in the part of the load cycle where the tines are mainly positioned outside the feed passage and the arm is moved back to beginning of the load cycle.

In an embodiment, the second driving device comprises a hydraulic rotary actuator. Such rotary actuator is very practical for movement of the fulcrum. For instance, when a crank or other arm like element is arranged on the shaft of the rotary actuator and the fulcrum is connected to the crank or arm, for instance by a rod or such, rotation of the rotary actuator over an angle, will rotate the crank or arm therewith moving the fulcrum between different positions. Preferably, the rotary actuator comprises a sensor to directly or indirectly measure a rotary position of the hydraulic rotary actuator. The output of such sensor will provide direct information on the position of the fulcrum.

In an embodiment, at least one retaining element is provided at or close to the outlet of the feed passage to retain crop material in the feed passage during stuffing of crop material, wherein said retaining element is movable between a retaining position in which the retaining element is placed in the feed passage and a non-retaining position in which the retaining element is arranged substantially outside the feed passage.

In an embodiment, the retaining element is mechanically linked with the second driving device, such that when the second driving device displaces the fulcrum for a load trajectory, the retaining element is moved to the non-retaining position. By actively moving the retaining element out of the feed passage at the beginning of the load trajectory, the second driving device does not have to provide an extra force to push the retaining element out of the feed passage. As a result, more force will be available for pushing the compressed crop material out of the feed passage.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
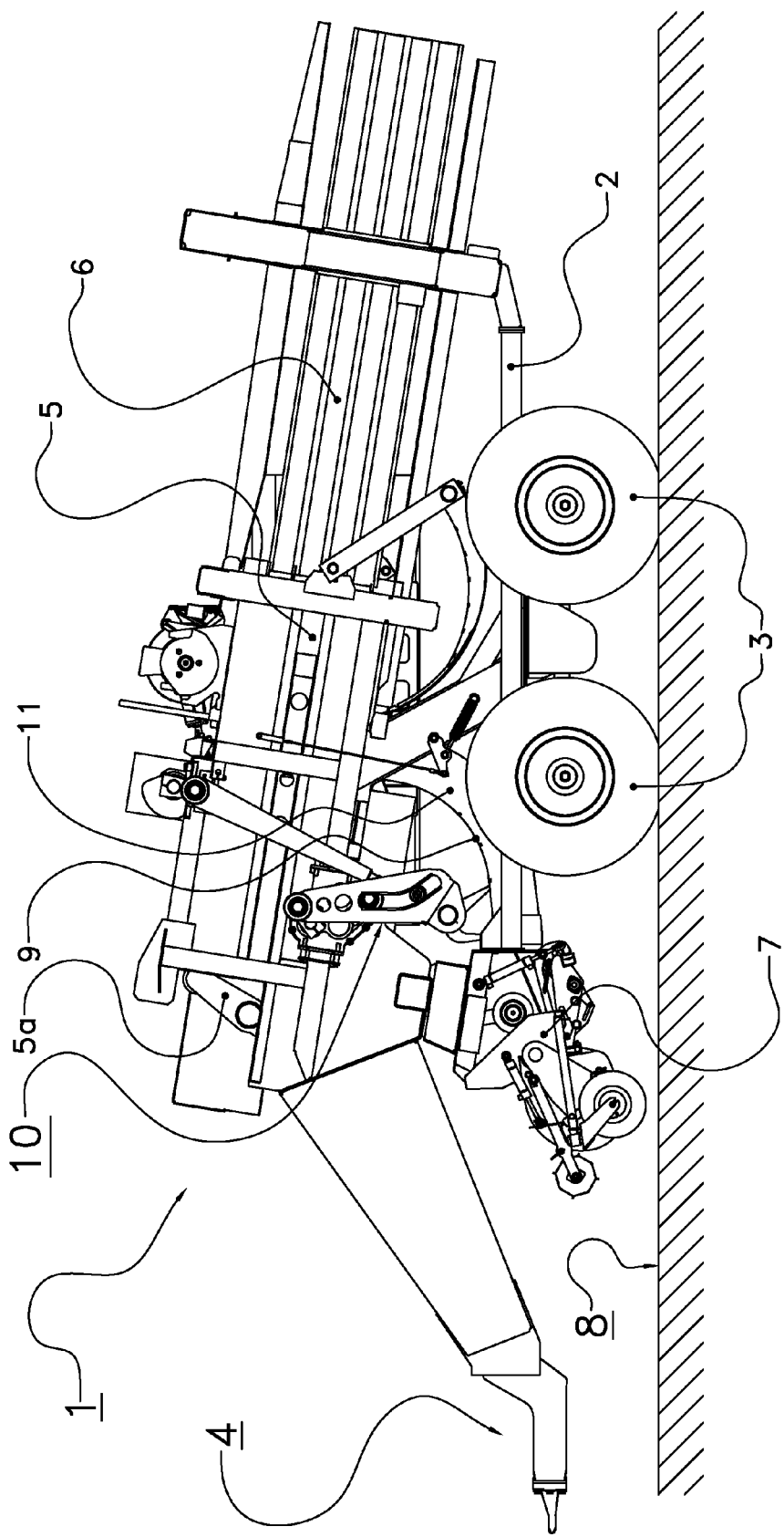
FIG. 1 shows a piston bale press according to the invention.

The following is a description of certain embodiments of the invention, given by way of example only and with reference to the drawings. FIG. 1 shows a side view of a piston bale press, generally denoted with the reference numeral 1. Piston bale presses of this type are generally known and for instance disclosed in EP 1 769 674, EP 0870 425, and U.S. Pat. No. 4,106,268, which are all hereby incorporated by reference in their entireties.

The piston bale press comprises a frame 2 supported by wheels 3. The piston bale press 1 is configured to be connected at its front end 4 to a pulling vehicle, for instance a tractor. The piston bale press 1 further comprises a piston press 5 configured to press crop material in rectangular bales in a bale chamber 6. A main drive mechanism 5a is provided to move the piston press 5 in an oscillating movement in the bale chamber 6 to compress crop material in the bale chamber 6. The piston bale press 1 further comprises an intake device 7 to take in crop material, i.e. agricultural harvested material, such as silage, grass, hay, or straw from a ground surface 8. To improve the compression of the crop material, a stuffing device 9 is provided to stuff crop material taken in by the intake device 7 in a feed passage 11 before it is loaded in the bale chamber 6. The stuffing device 9 comprises a stuffing mechanism 10 which is configured to stuff crop material in a feed passage 11 to obtain a quantity of crop material with a desired density before the crop material is loaded in the bale chamber 6.

The stuffing device 9 will now be discussed in more detail with reference to FIGS. 2-6.

Figure 2:
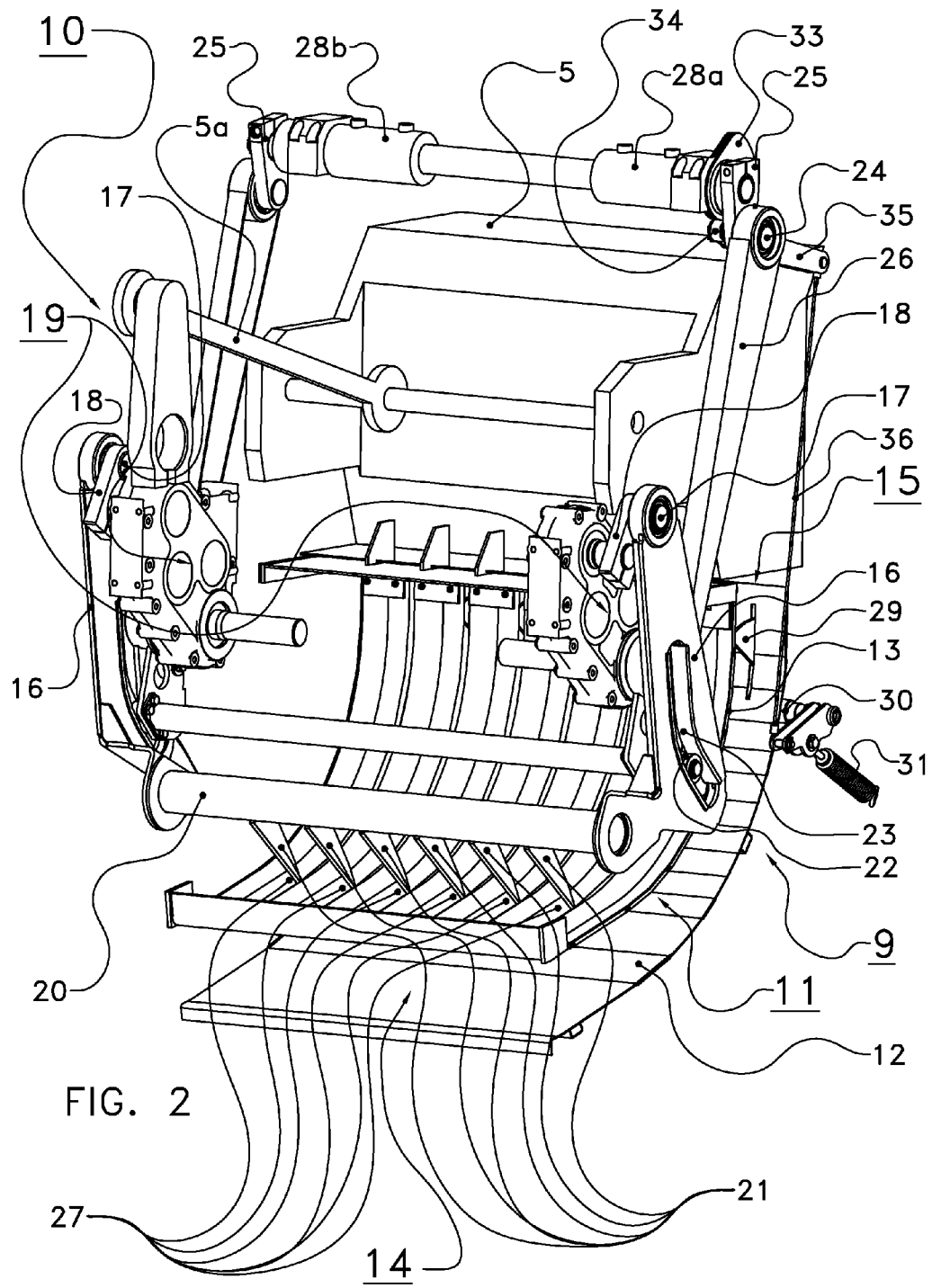
FIG. 2 shows a perspective view of an embodiment of the stuffing device of the invention.

FIG. 2 shows a perspective view of the stuffing device 9. The stuffing device 9 comprises the feed passage 11 formed between a lower plate 12 and an upper plate 13. An inlet 14 of the feed passage 11 is connected to the intake device 7, and an outlet 15 of the feed passage 11 is connected to the bale chamber 6.

The stuffing mechanism 10 comprises at opposite sides of the piston press 1 two arms elements 16. The arm elements 16 are pivotably supported at pivot axes 17 by cranks 18. The cranks 18 are each rotatably driven by a first driving device 19. The driving device 19 comprises a gear box which may be connected to a motor or other actuation device, for instance to the main drive mechanism 5a. Between the two arms elements 16 a bar 20 with tines 21 is mounted. The gearbox could for instance also be integrated in the main driving mechanism.

A fulcrum 22 is located in a slot 23 of each arm element 16. The fulcrum 22 is arranged at one end of a bar 26. The other end of the bar 26 is pivotably supported at pivot axis 24 by a crank 25. The crank 25 is connected to a pair of hydraulic rotary actuators 28a, 28b. The hydraulic actuators 28a, 28b are configured to pivot the cranks 25 over a certain angle therewith moving the fulcrum 22.

Figure 3:
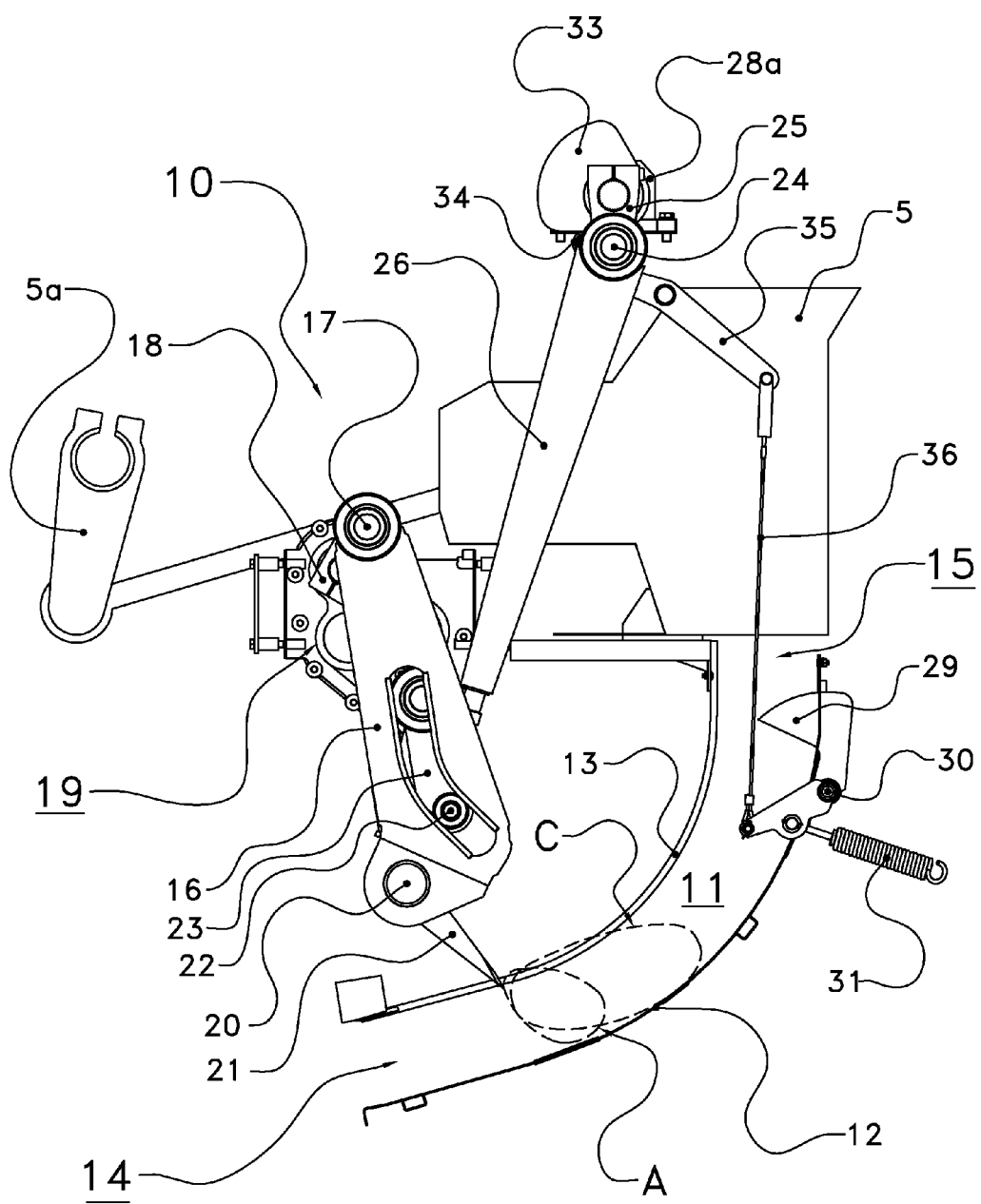
FIGS. 3-6 show side views of the stuffing device of FIG. 2.
Figure 4:
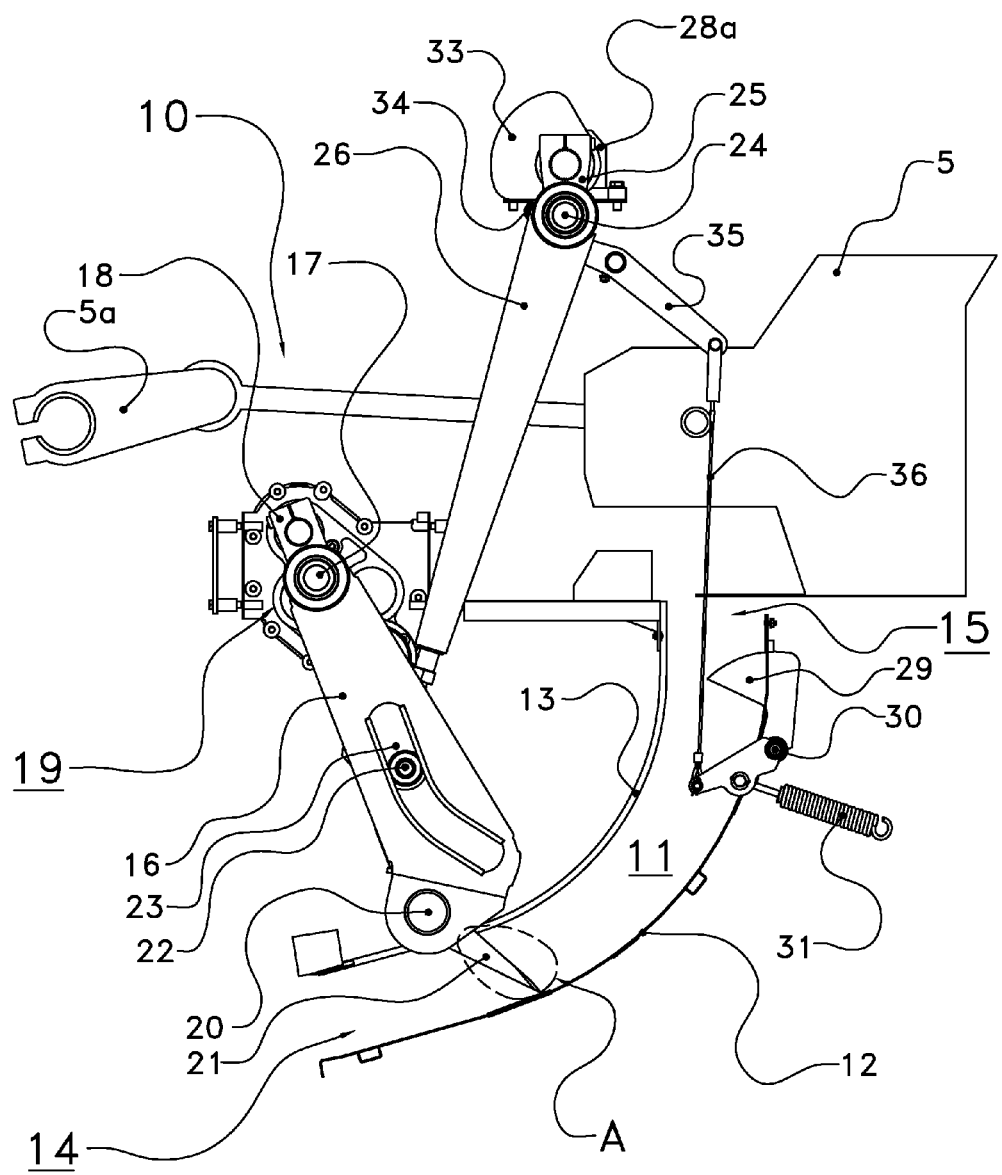

By rotation of the crank 18, the pivot axis 17 will be moved in a circular movement with respect to the first driving device 19. The curved slot 23 will slide along the stationary fulcrum 22. As a result of this movement and the curved slot 23, the tines 21 will be moved along a trajectory A as shown in FIGS. 3 and 4. During this movement, the tines 21 will be moved in and out of the feed passage 11 through slots 27 (see FIG. 2) arranged in the upper plate 13.

The trajectory A can be used as a stuffing trajectory to stuff crop material taken in by the intake device 7 in the feed passage 11 until the crop material is sufficiently compressed in the feed passage 11 to be loaded in the bale chamber 6.

Figure 5:
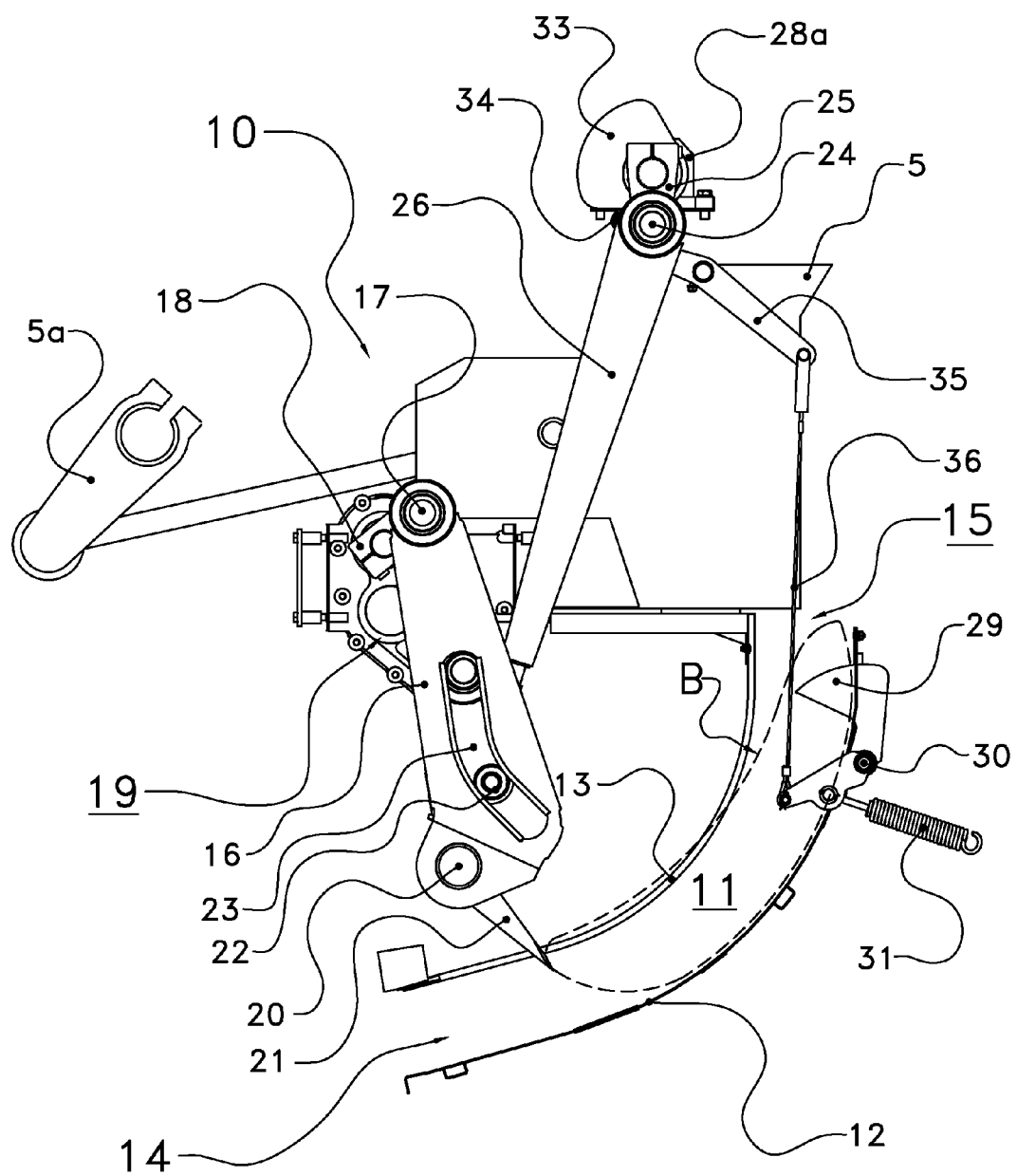
Figure 6:
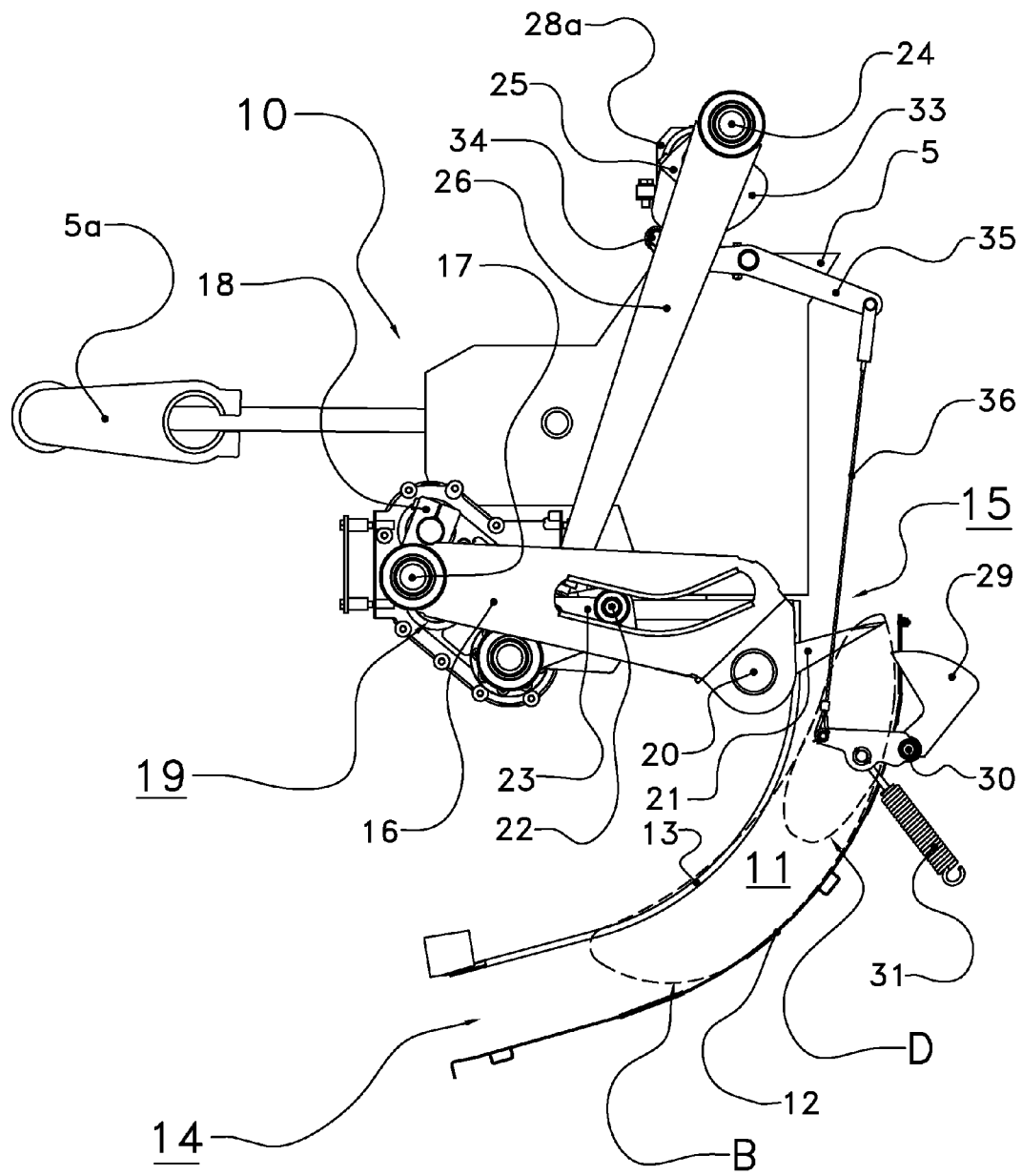

By movement of the fulcrum 22 the trajectory of the tines 21 can be changed. For instance, when during the rotation of pivot axis 17, the fulcrum 22 is moved by actuation of the hydraulic actuators 28a, 28b, the tines 21 can be moved along a load trajectory B as shown in FIGS. 5 and 6. This load trajectory can be used to load a quantity of stuffed crop material from the feed passage 11 to the bale chamber 6 where it is used to form a bale.

The operation of the hydraulic actuators 28a, 28b is independent of the main driving mechanism 5a as it is not mechanically linked to this main driving mechanism. This has the advantage that the movements of the fulcrum 22 can be made independent of the movement of the main driving mechanism 5a. For instance, the length of displacement or the speed of displacement can be changed during the trajectory of the tines.

Furthermore, intermediate trajectories. i.e. cycles larger than stuffing trajectory A but smaller than load trajectory B can be made. An example of such intermediate trajectory is indicated as trajectory C in FIG. 3. Such intermediate trajectories may for instance be useful for stuffing crop material with different characteristics, for instance crop material having different moisture contents. In another embodiment, it may be possible to move tines 21 along a trajectory D as indicated in FIG. 6. In this trajectory D the tines 21 only load the stuffed material out of an upper part of the feed passage 11 in the bale chamber 6. Such trajectory D may be advantageous when there is a risk of compressed material clogging the feed passage 11. By moving the tines 21 along trajectory D and loading only a part of the stuffed material from the feed passage 11 in the bale chamber 6, blocking of the feed passage may effectively be prevented.

The actuation of the actuators 28a, 28b may be configured to move the tines 21 in a first part of a cycle, for instance when the tines 21 are located in the feed passage 11 and compress crop material, relative slow and with a large force, and in the second part of the cycle where the tines 21 are located outside the feed passage 11 with increase speed to optimize cycle time.

It will be clear that although the independent actuators 28a, 28b provide large flexibility with respect to the movement of the tines 21, the movement of the tines 21, in particular the timing of the load trajectory have to be adjusted to the movement of main driving mechanism so that only crop material may be introduced in the bale chamber 6, when the piston 5 is located at the correct side of the outlet 15 of the stuffing device 9, as shown in FIG. 6.

To avoid that crop material is pressed out of the outlet 15 of feed passage 11 before the desired density is obtained, retaining elements 29 are arranged to retain crop material in the feed passage 11. The retaining elements 29 are mounted on a pivotable bar 30 so that the retaining elements are movable between a retaining position as shown in FIGS. 3 and 4 and a non-retaining position where the retaining elements 29 are mainly held outside the feed passage 11 (See FIG. 6) to make the transfer of crop material out of the outlet 15 possible.

A spring 31 is provided to hold the retaining elements 29 biased in the retaining position. A sensor may be provided to measure the angular position of the pivotable bar 30. This angular position of the bar 30 is a measure of the force exerted by the crop material in the feed passage 11 on the retaining elements 29, as this position is related to the force that has to be exerted to extend the spring 31 to the respective angular position. This force is a measure of the compression reached in the crop material.

The output of the sensor may be used to control the actuation of the hydraulic actuators 28a, 28b. For instance, an angular potentiometer may be provided as a sensor to measure the angular position of the pivotable bar 30. When the angular position exceeds a certain predetermined angle, the compression of the crop material in the feed passage 11 is sufficient to transfer the crop material to the bale chamber 6. the resulting signal may be used to activate the hydraulic cylinders 28a, 28b to move the tines 21 along the load trajectory B.

As soon as the load trajectory is started it is advantageous to bring the retaining elements 29 out of the feed passage 11, since the retaining elements 29 still are at least partially positioned in the feed passage 11 and may hinder the crop material of being transferred to the bale chamber 6.

To take the retaining elements automatically out of the feed passage 11, the output shaft of the hydraulic cylinder 28a is coupled to a cam 33 which cooperates with a follower 34 mounted on a pivotable element 35 which is connected via a cable 36 to the pivotable retaining elements 29. When the hydraulic actuator 28b is actuated to displace the fulcrum 22 so that the tines 21 move along the load trajectory B, the cam 33 is also rotated and due to the resulting movement of the follower 34 the retaining elements 29 are pulled by the cable 36 out of the feed passage 11. The movement of the crop material to the bale chamber 6 will not be hindered by the retaining elements 29.

When the tines 21 are moved back towards the inlet 14 of the feed passage 11, the output shaft of the actuator 28a is rotated back therewith also moving the cam 33 back to the start position as shown in FIG. 3. As a result of the spring force of spring 31, the retaining elements 29 will be moved back into the feed passage 11 to retain crop material in the feed passage 11 during subsequent stuffing cycles.

Figure 7:
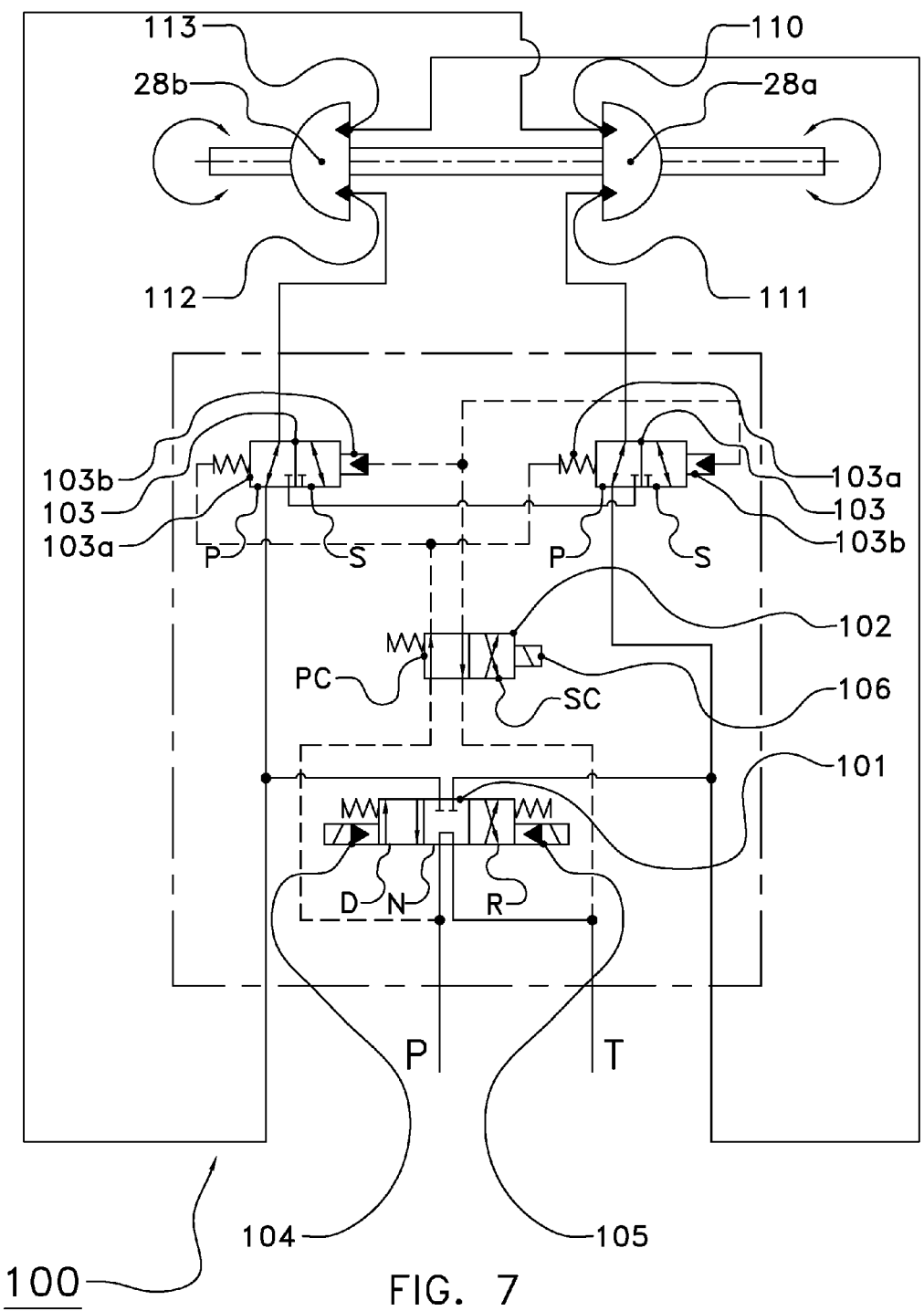
FIG. 7 shows a hydraulic scheme for actuation of the stuffing mechanism of FIG. 2.

FIG. 7 shows a hydraulic circuit 100 for actuation of the two hydraulic rotary actuators 28a, 28b. The circuit 100 is connected to a hydraulic pressure source P, and a tank T.

The actuator 28a comprises a port 110 which upon pressurization rotates the output shaft of actuator 28a in a driving direction, and a port 111 which, upon pressurization, rotates the output shaft of the actuator 28a in a reverse driving direction. Correspondingly, the actuator 28b comprises a port 112 which, upon pressurization, rotates the output shaft of the actuator 28b in a driving direction, and a port 113 which, upon pressurization, rotates the output shaft of the actuator 28b in a reverse driving direction.

The circuit 100 comprises a three-way actuation valve 101, a control valve 102, and two two-way valves 103.

The actuation valve 101 can be arranged in a driving position D, a neutral position N and a reverse driving position R. The actuation valve 101 is biased in the neutral position. Solenoids 104 and 105 are provided to position upon an actuation signal the actuation valve in the driving position D or the reverse driving position R, respectively.

The control valve 102 and the two two-way valves 103 are provided to arrange the hydraulic actuators 28a, 28b in a parallel circuit or a serial circuit.

The two-way valves 103 are arranged to simultaneously be in a parallel position P or serial position S. In the parallel position the ports 111 and 112 are fluidly connected to the actuation valve 101, and in the serial position the ports 111 and 112 are fluidly connected to each other. The two-way valves 103 are biased in the parallel position.

The two way valves 103 can be actuated by fluid pressure at actuation ports 103a and 103b. The actuation ports 103a and 103b are connected to the control valve 102. The control valve 102 comprises a parallel control position PC to actuate the actuation ports 103a to locate the two-way valves 103 in the parallel position P, and a serial control position SC to actuate actuation ports 103b to locate the two-way valves 103 in the serial position S.

The control valve 102 is biased in the parallel control position PC, and can be brought in the serial control position SC by activation of the solenoid 106.

With the hydraulic circuit shown in FIG. 7 it is possible to drive the hydraulic actuators 28a, 28b serially and parallel in a driving direction and a reverse driving direction.

When the actuation valve 101 is arranged in the driving position D by activation of a solenoid 104, the pressure source P will be connected to port 110 of the hydraulic actuator 28a and to port 112 of the hydraulic actuator 28b. The ports 111 and 113 are connected to the tank T. The solenoid 104 may for instance be activated when it is determined by a sensor that the pivotable bar 30 has passed a predetermined angular position indicating that the crop material in the feed passage 11 has reached a desired density for loading the crop material in the bale chamber 6.

In another embodiment, the solenoid 104 may be activated after a fixed number of stuffing cycles of the tines 21, or when the crop material in the stuffing device comprises characteristics, for instance density or moisture content, for which a larger stuffing cycle is desirable. These characteristics may be determined by a sensor. In another embodiment the desired number and trajectory of the stuffing and load cycle may be adjusted by a user of the piston bale press, for instance by an input device such as a keyboard.

As a result of the activation of the solenoid 104, the hydraulic actuators 28a, 28b are actuated in parallel and a relative large force can be exerted on the fulcrum 22 and therewith on the tines 21. This force may for instance be used to efficiently press crop material out of the feed passage 11.

Due to the angular movement of the hydraulic actuator 28a, the cam 33 will press the follower 34 downwards therewith pulling cable 36 upwards due to the pivotal movement of pivotable element 35. As a result, the retaining elements 29 will be moved out of the feed passage 11 therewith facilitating the loading of the crop material into the bale chamber 6.

When the maximum speed of movement of the tines 21 is of more importance than the force to be exerted by the tines 21, the control valve 102 may be brought from the parallel control position PC to the serial control position SC by activation of the solenoid 106. As a result, the pressure source P will be connected to the actuation ports 103b and the two-way valves 103 will be brought in the serial position S therewith fluidly connecting the ports 111 and 112. Only the hydraulic port 110 is now connected directly to the pressure source P and the hydraulic actuators 28a, 28b are actuated serially, and the maximum speed of movement is increased.

The angular position of the hydraulic actuators 28a, 28b may be measured by a sensor. When the fulcrum 22 has reached the end position in the load trajectory, for instance determined by the sensor, the actuation valve 101 may be arranged in the reverse driving position R to start the return path of the tines 21. To arrange the hydraulic actuator 28b in the reverse driving position the solenoid 105 may be actuated. As a result, at least the port 113 of the actuator 28b will directly be pressurized, i.e. connected to pressure source P.

When the control valve 102 is in the parallel control position PC, also the port 111 will directly be connected to the pressure source P and the actuators 28a, 28b will be actuated in parallel. When the control valve 102 is arranged in the serial control position SC the ports 111 and 112 will be connected to each other, and as a result the actuators 28a, 28b will be actuated serially.

Generally, in a load trajectory, it will be desirable to exert a maximum force during actuation of the control valve 101 in the driving position D in order to push the crop material out of the feed passage 11, and to have maximum speed during actuation of the control valve in the reverse driving position R to move as fast as possible the tines 21 back towards the inlet 14 of the feed passage 11, since during this return movement no pressure has to be exerted on crop material. Therefore, it may be desirable to actuate the actuators 28a, 28b in parallel when the actuation valve 101 is in the driving position D and serially when the actuation valve 101 is in the reverse driving position R.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An agricultural piston bale press, comprising:
    a pressing piston arranged in a bale chamber to form bales of crop material,
    a main driving mechanism to drive the pressing piston in an oscillating movement in the bale chamber;
    an intake device to take in crop material, and
    a stuffing device to stuff crop material taken in by the intake device and to load the stuffed crop material to the bale chamber;
    wherein the stuffing device comprises a feed passage and a stuffing mechanism, the stuffing mechanism comprising an arm supporting tines which arm is configured for movement along a stuffing trajectory to stuff crop material in said feed passage and a load trajectory to load stuffed crop material from said feed passage in said bale chamber;
    wherein said arm is movable by a first driving device to at least move the tines in and out of the feed passage and wherein said arm is pivotably supported by a fulcrum, the fulcrum being displaceable to selectively move the arm along the stuffing trajectory or load trajectory;
    and wherein the stuffing device comprises a second driving device to displace the fulcrum, and in that the second driving device is mechanically independent of the main driving mechanism.

2. The agricultural piston bale press of claim 1, wherein actuation of the second driving device is adjustable in order to adjust at least one of distance and speed of displacement of the fulcrum.

3. The agricultural piston bale press of claim 1, wherein the second driving device comprises a hydraulic actuator.

4. The agricultural piston bale press of claim 1, wherein the second driving device comprises two hydraulic actuators which can be actuated serially and in parallel.

5. The agricultural piston bale press of claim 4, wherein in a part of the stuffing trajectory or load trajectory wherein the tines move towards the bale chamber the two actuators are actuated in parallel, and in a part of the stuffing or load trajectory wherein the tines move away from the bale chamber the two actuators are actuated serially.

6. The agricultural piston bale press of claim 1, wherein the second driving device comprises at least one hydraulic rotary actuator.

7. The agricultural piston bale press of claim 6, wherein the at least one hydraulic rotary actuator comprises a sensor to directly or indirectly measure a rotary position of the hydraulic rotary actuator.

8. The agricultural piston bale press of claim 1, wherein in a part of the stuffing trajectory or load trajectory wherein the tines move towards the bale chamber, the tines are moved slower than in a part of a stuffing or load trajectory wherein the tines are moved away from the bale chamber.

9. The agricultural piston bale press of claim 1, wherein the stuffing device is configured to move the arm along two or more stuffing trajectories of different lengths.

10. The agricultural piston bale press of claim 9, wherein the selection of the stuffing trajectory is dependent on at least one of: the crop material to be stuffed and its moisture content.

11. The agricultural piston bale press of claim 10, wherein a sensor is provided to determine at least one of: the type of crop material to be stuffed and its moisture content to select a suitable stuffing trajectory.

12. The agricultural piston bale press of claim 1, wherein the tines are arranged at a first end of the arm, wherein the first driving device drives the opposite end of the arm in a rotary movement, and wherein the fulcrum is located in a slot in said arm.

13. The agricultural piston bale press of claim 12, wherein the slot is curved, such that driving of said arm by only the first driving device results in a stuffing cycle movement of said arm.

14. The agricultural piston bale press of claim 1, wherein at least one retaining element is provided at or close to the outlet of the feed passage to retain crop material in the feed passage during stuffing of crop material, wherein said retaining element is movable between a retaining position in which the retaining element is placed in the feed passage and a non-retaining position in which the retaining element is arranged substantially outside the feed passage.

15. The agricultural piston bale press of claim 14, wherein the retaining element is mechanically linked with the second driving device, such that when the second driving device displaces the fulcrum for a load trajectory, the retaining element is moved to the non-retaining position.

* * * * *